United States Patent [19]

Maeda et al.

[11] Patent Number: 4,660,191
[45] Date of Patent: Apr. 21, 1987

[54] TRACKING SIGNAL ERROR GENERATOR FOR OPTICAL INFORMATION DEVICES

[75] Inventors: Takanori Maeda; Kenjiro Hamanaka, both of Saitama, Japan

[73] Assignee: Pioneer Electronic Corporation, Tokyo, Japan

[21] Appl. No.: 677,056

[22] Filed: Nov. 30, 1984

[30] Foreign Application Priority Data

Dec. 1, 1983 [JP] Japan ................. 58-227281

[51] Int. Cl.$^4$ ............................................. G11B 7/08
[52] U.S. Cl. .................................................... 369/46
[58] Field of Search ..................................... 369/43–46; 250/201 AF, 201 DF

[56] References Cited

U.S. PATENT DOCUMENTS

| 4,338,682 | 7/1982 | Horaka et al. | 369/46 X |
| 4,541,084 | 9/1985 | Oku et al. | 369/45 |
| 4,542,491 | 9/1985 | Takasago et al. | 369/46 |
| 4,561,080 | 12/1985 | Yamayaki | 369/45 |

FOREIGN PATENT DOCUMENTS

| 58140 | 5/1981 | Japan | 369/43 |
| 199473 | 11/1983 | Japan | 369/46 |

Primary Examiner—Aristotelis M. Psitos
Attorney, Agent, or Firm—Finnegan, Henderson, Farabow, Garrett and Dunner

[57] ABSTRACT

A tracking error signal generator includes first, second, and third light receptors for receiving light fluxes reflected from a recording medium and for generating respective first, second, and third output signals. The light fluxes impinge upon the recording medium along a line having a predetermined angle with respect to a recording track. In an embodiment, the tracking error signal is set to the difference between the first and second output signals if the difference between the first and third output signals is less than zero or to the difference between the second and third output signals if the difference between the first and third output signals is greater than zero. In a second embodiment, if the difference between the first and third output signals is within, below, or above a preselected range, the tracking error signal is set to the difference between the first and third output signals, the first and second output signals, or the second and third output signals, respectively.

8 Claims, 12 Drawing Figures

TRACKING SIGNAL ERROR GENERATOR FOR OPTICAL INFORMATION DEVICES

FIELD OF THE INVENTION

The present invention relates to tracking error signal generators and specifically relates to a tracking signal generator in an optical information recording and reproducing device.

BACKGROUND OF THE INVENTION

In order to cause a recording information detection flux or an information recording flux to accurately follow an information track on a recording medium, a tracking servo device is used. It is required to generate a tracking error signal as a servo signal for the servo loop of the servo device. For this, a so-called three-beam method has been used. In this method, as shown in the schematic diagram of FIG. 1 a pair of light fluxes 1 and 3 are irradiated so that they form a pair of tracking beams to be disposed symmetrically with a main beam forming light flux 2 sandwiched therebetween on a line forming a predetermined angle with respect to a recording track $T_0$ to which tracking is performed. Reflection or transparent light rays of the pair of tracking beams from the recording medium are respectively received by a pair of light reception elements 4 and 5. The difference between the respective outputs A and B of the light reception elements 4 and 5 is calculated by a differential amplifier 6. This difference output, that is $A-B$, is used as a tracking error signal.

$T_1$ and $T_2$ are the recording tracks respectively disposed adjacent to the opposite sides of the target recording track $T_0$. The track pitch is selected to be T so that the distance between the main beam 2 and each of the tracking beams 1 and 3 in the direction perpendicular to the tracks is $T/4$.

FIG. 2 is a signal diagram showing the changing state of the signals A and B and the difference signal $A-B$ with respect to an offset of the main beam 2 in the direction perpendicular to the tracks in the device of FIG. 1. Since a substantially linear error characteristic can be obtained within a range of $\pm T/4$ of the offset of the main beam 2 with respect to the target track $T_0$ in the direction perpendicular to the tracks, the output $A-B$ of the differential amplifier 6 can be used as a tracking error signal.

In the case where the track pitch is not fixed and, for example, it is narrow, a sufficient tracking error cannot be obtained in this method. For example, if the track pitch of the right-hand adjacent track $T_1$ with respect to the object track $T_0$ is small, the signal characteristic at various portions changes as shown in FIG. 3. The light quantity characteristic of the tracking beam 1 near to the track $T_1$ takes the maximum value within the range of $\pm T/4$ for the offset in the right direction (R) as shown by a curved line A in FIG. 3 and decreases for further rightward offset. Thus, there is a disadvantage that the tracking error signal $A-B$ becomes abnormal for the rightward offset of the main beam 2. Such a disadvantageous phenomenon similarly occurs in the case where the track pitch of the left-hand adjacent track is small with respect to the target track $T_0$.

FIGS. 4 and 5 illustrate the respective characteristics of the signals A and B at various portions and the difference $A-B$ therebetween corresponding to the cases where the distance between the main beam 2 and each of the tracking beams 1 and 3 in the direction perpendicular to the tracks is smaller and larger than $T/4$, respectively. In both cases, the tracking error signal $A-B$ also shows a substantially linear characteristic within the range of $\pm T/4$. It is required, however, to obtain a linear tracking error characteristic in a range beyond the range of $\pm T/4$.

OBJECTS AND SUMMARY OF THE INVENTION

An object of the present invention is to provide a tracking error signal generator in which a linear tracking error signal covers a wide range even if the track pitch is small.

Another object of the present invention is an accurate tracking error signal generator.

Still another object of the present invention is to provide a linear tracking error signal over a wide range of deviations from a target recording track.

A further object of the present invention is a tracking error signal generator that is accurate and responsive over a broad range of track pitches.

The tracking error signal generator according to the present invention is characterized in that a main beam and a pair of tracking beams sandwiching the main beam are irradiated so as to be aligned on a line forming a predetermined angle with respect to a recording track on an information recording medium. The difference between a light reception output of a tracking beam nearer to a target track to which tracking is made and that of the main beam is determined and used as a tracking error signal.

BRIEF DESCRIPTION OF THE DRAWINGS

The manner in which these and other objects, features, and advantages of the present invention are attained will be clearly understood in the light of the following detailed description when considered in view of the following drawings, wherein.

DETAILED DESCRIPTION

Figure 1:
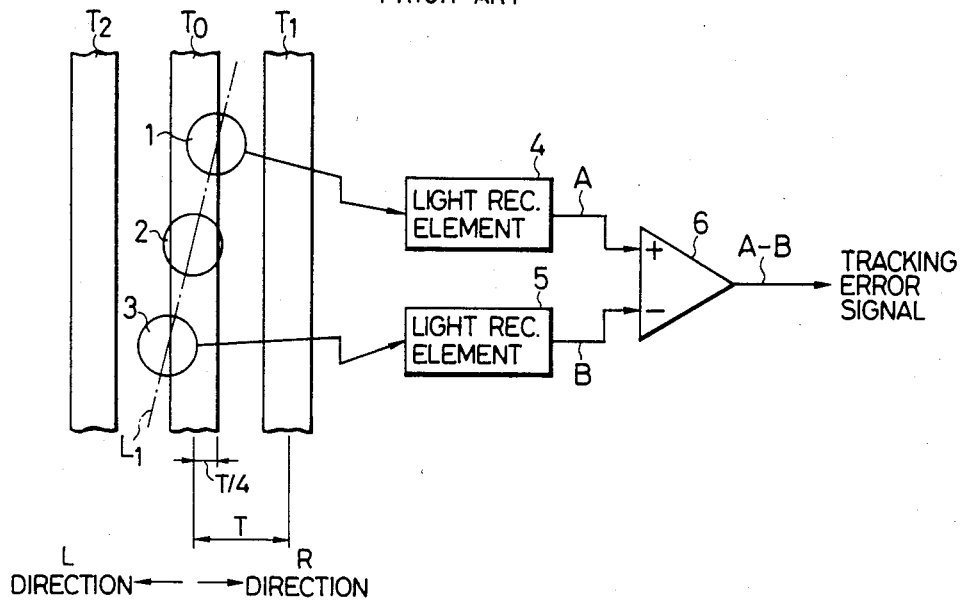
FIG. 1 is a block diagram of a conventional tracking error signal generator.
Figure 2:
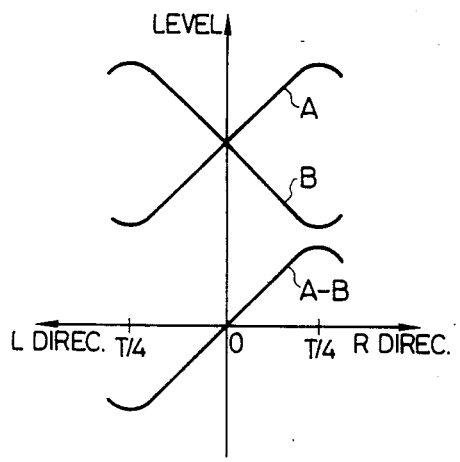
FIGS. 2–5 are signal diagrams illustrating the operative characteristics of the device of FIG. 1.
Figure 6:
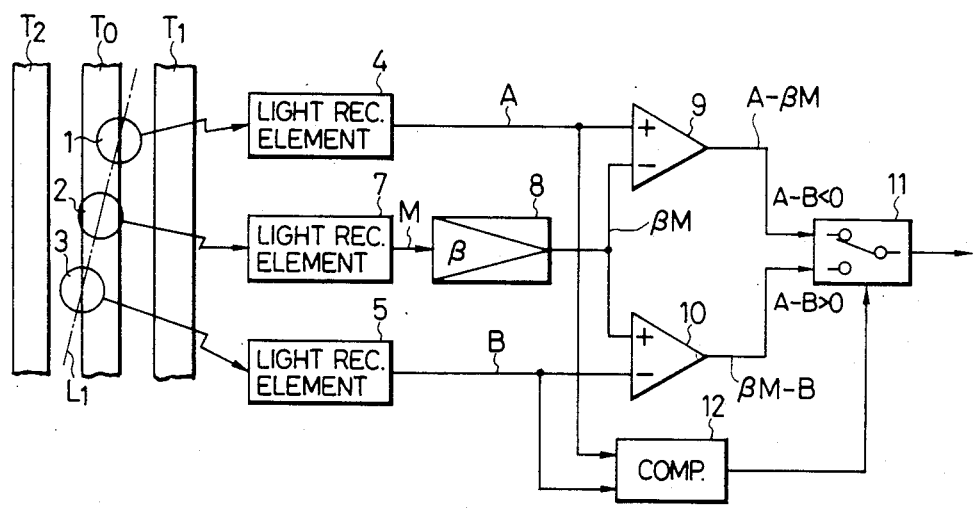
FIG. 6 is a block diagram of the tracking error signal generator of the present invention.

FIG. 6 is a circuit block diagram of one embodiment of the tracking error signal generator of the present invention and the same parts as those shown in FIG. 1 are designated by the same reference numerals as those used in FIG. 1. In addition to light reception elements 4 and 5 for a pair of tracking beams 1 and 3, a light reception element 7 is provided for the main beam 2. An output M of the light reception element 7 is applied to an amplifier 8 having a gain $\beta$. An output $\beta M$ of the amplifier 8 is applied to one input of each of the differential amplifiers 9 and 10, and the outputs A and B of the light reception elements 4 and 5 are respectively applied to the other input of each of the same differential amplifiers 9 and 10.

Difference outputs $A-\beta M$ and $\beta M-B$ are respectively obtained from the differential amplifiers 9 and 10, and one of these difference outputs is selected by an analog switch to obtain a tracking error signal.

For selecting control of the analog switch 11, there is provided a comparator 12 comparing the respective levels of the outputs A and B of the light reception elements 4 and 5. The comparison output is used as a switch control signal. That is, the analog switch 11 is arranged so as to selectively provide the output $A-\beta M$ of the differential amplifier 9 if $A-B<0$, or the output $\beta M-B$ of the differential amplifier 10 if $A-B>0$.

Figure 7A:
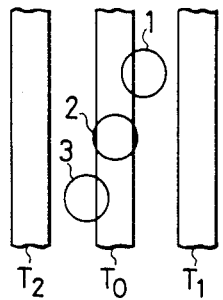
FIGS. 7a–c, 8 and 9 are signal diagrams showing the operative characteristics of the device of FIG. 6.
Figure 7B:
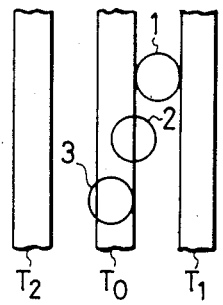

When the main beam 2 is correctly positioned on the target track $T_0$ as shown in FIG. 7(a), the respective light reception outputs A and B by the tracking beam 1 and 3 are equal to each other, that is $A-B=0$, and the tracking error signal is zero. If the main beam 2 shifts right relative to the target track $T_0$ as shown in FIG. 7(b) in the direction perpendicular to the target track $T_0$, the tracking beam 1 is caught on a mirror face portion between the tracks $T_0$ and $T_1$ and the output A of the light reception element 4 increases. At the same time, the tracking beam 3 is caught on the track $T_0$ and the output B of the light reception element 5 decreases. Accordingly, since $A-B>0$, the analog switch 11 produces the output $\beta M-B$ of the differential amplifier 10 as an error signal.

The gain $\beta$ of the amplifier 8 is selected to be $\beta M_0 = T_0$ in the normal position of FIG. 7(a), that is when the light reception outputs A and B of the tracking beams 1 and 3 are equal to each other and $A=B=T_0$, $M_0$ represents the light reception output M of the main beam 2 at this time.

Figure 7C:
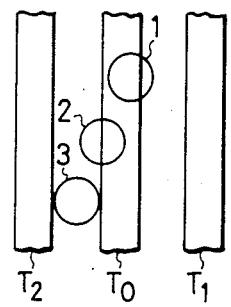

If the main beam 2 shifts left relative to the target track $T_0$ in the direction perpendicular to the target track $T_0$ as shown in FIG. 7(c), the difference $A-B$ becomes less than zero, that is $A-B<0$, the analog switch 11 produces the output $A-\beta M$ of the differential amplifier 9 as an error signal.

Figure 8:
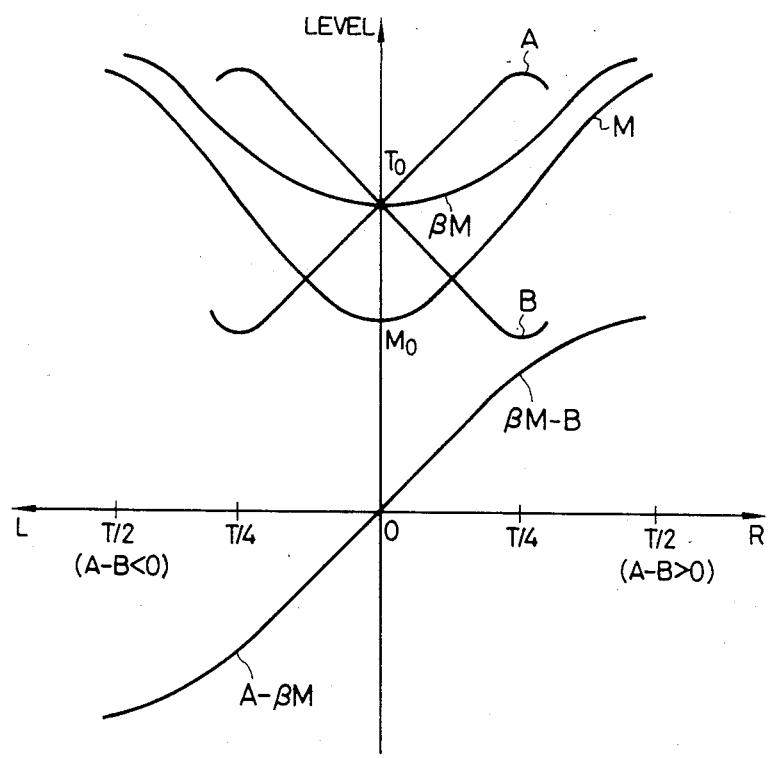

FIG. 8 shows characteristics of changes in signals at various times with respect to an offset of the main beam 2 in the direction perpendicular to the track obtained by the operations as described above. As shown, a tracking error can be accurately obtained over an offset range of about $\pm T/2$.

Figure 3:
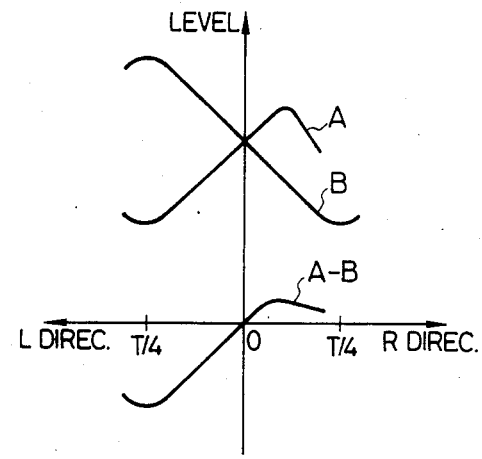
Figure 4:
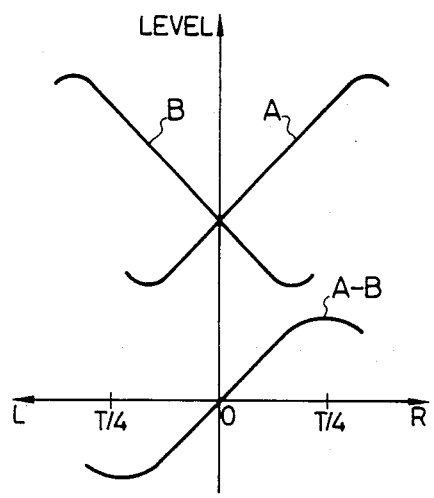
Figure 5:
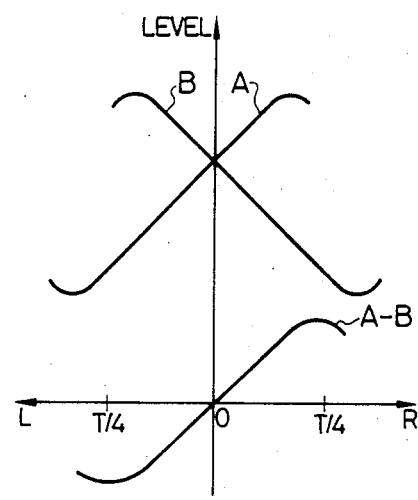
Figure 9:
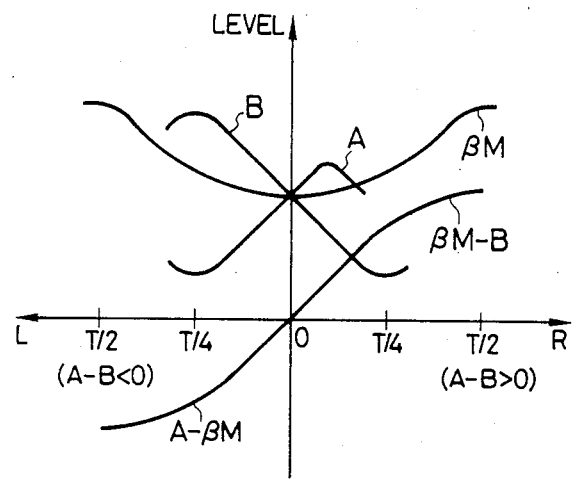

FIG. 9 shows changes in the waveforms of signals at various parts in the blocks of FIG. 6 in the case where the track pitch of the right-hand track $T_1$ with respect to the target track $T_0$ is small, and corresponds to that of FIG. 3 used for explaining the conventional case. Thus, according to the present invention, an accurate tracking error can be obtained over a wide offset range, for example $\pm T/2$, even if the track pitch becomes small. The respective characteristics of FIGS. 8 and 9 can be similarly obtained not only in the case where the distance between the tracking beam and each of the pair of the tracking beams in the direction perpendicular to the track is selected to be T/4, but also in other cases.

Figure 10:
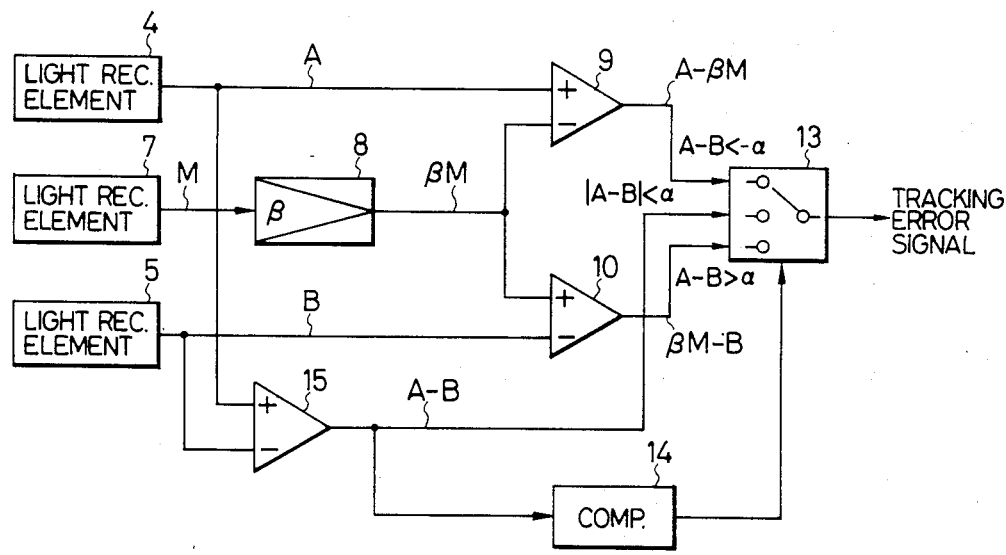
FIG. 10 is a block diagram of another embodiment of the tracking error signal generator of the present invention.

FIG. 10 is a block diagram of another embodiment of the present invention and the same elements as those in FIG. 6 are designated by the same reference numerals as those used in FIG. 6. As an analog switch 13 for this embodiment, a 3-input, 1-output switch is used. That is, in the switch 13, a third input for receiving $A-B$ is provided in addition to the two inputs for receiving $A-\beta M$ and $\beta M-B$. A differential amplifier 15 is provided for obtaining the difference between the outputs A and B of the respective light reception element 4 and 5.

For the selecting control of the analog switch 13, there is provided a comparator 14 to which the output $A-B$ of the differential amplifier 15 is applied. The comparator 14 produces a first control signal when $|A-B|<\alpha$ ($\alpha$ being negative constant) and the switch 13 selects the output $A-B$ of the differential amplifier 15 in response to the first control signal. When $A-B<-\alpha$, the comparator 14 produces a second control signal and the switch 13 selects the output $A-\beta M$ of the differential 9 in response to the second control signal. Further, when $A-B<-\alpha$, the comparator 14 produces a third control signal and the switch 13 selects the output $\beta M-B$ of the differential amplifier 10 in response to the third control signal.

Since the signal $A-B$ has a linear characteristic with respect to an offset of the main beam in the case where the absolute value $|A-B|$ falls within a small range $\alpha$, a signal component $A-B$ is used as a tracking error signal within this range in a manner similar to the conventional case. In a normal operation, an error within this range $\alpha$ is small and it is sufficient to use the signal component $A-B$. In the case where $A-B<-\alpha$ or $A-B>\alpha$ over the range $\pm T/2$, $A-\beta M$ or $\beta M-B$ is correspondingly selected to expand the linear characteristic range of the tracking error signal as in the embodiment of FIG. 6. Thus, $A-B$ is derived in a normal state, similarly to the embodiment of FIG. 6, and the analog switch 11 does not effect its switching operation so that switching noises can be prevented.

Although level adjustment is made by using the amplifier 8 with respect to the light reception output M of the main beam in the embodiments described above, a similar effect can be obtained in the case where the level adjustment is made by using an amplifier having a gain $\beta = M_0T_0$ with respect to each of the light reception outputs A and B of the tracking beams. The arrangement, as described above, can be applied to not only a recorded information reproducing device but also an information recording device.

As described above, according to the present invention, a light reception output of a tracking beam nearer to a target track to which tracking is made by a main beam is used to obtain a difference between the light reception output and a light reception signal of the main beam which is used as a tracking error signal, so that there is such a distinguishing effect that a tracking error signal having good linearity can be obtained over a wide range.

It should be understood that the present invention is not limited to the particular embodiments described, but rather is susceptible to modifications, alterations, and equivalent arrangements within the scope of the appended claims.

What is claimed is:

1. A tracking error signal generator comprising:
   means for producing first, second, and third light fluxes aligned along a line having a predetermined angle with respect to a recording track on an information recording medium, said second light flux being positioned between said first and third light fluxes on said line;
   first, second, and third light reception elements for receiving said first, second, and third light fluxes, respectively, reflected from said information recording medium and for producing first, second, and third output signals, respectively, having values corresponding to the intensities of the reflected fluxes received by said light reception elements;

first difference means for producing a first difference signal corresponding to the difference between said first and second output signals;

second difference means for producing a second difference signal corresponding to the difference between said second and third output signals;

comparison means for determining the difference between said first and third output signals for producing a third difference signal; and output signal selector means controlled by said comparison means for outputting a tracking error signal corresponding to said first difference signal at times when the difference between said first and third output signals is less than a predetermined value and corresponding to said third difference signal at times when the difference between said first and third output signals is greater than a predetermined value.

2. A tracking error signal generator according to claim 1, wherein said first and second difference means comprise first and second differential amplifiers, respectively.

3. A tracking error signal generator according to claim 2, further including an amplifier for amplifying said second output signal and for supplying said amplified signal to each of said first and second differential amplifiers.

4. A tracking error signal generator according to claim 3, wherein said comparison means comprises:

a comparator responsive to said first and third output signals for generating a selection signal having a value corresponding to the difference between said first and third output signals; and wherein said output signal selector means comprises a switch having a first input for receiving said first difference signal and a second input for receiving said second difference signal, said switch being responsive to said selection signal for setting said tracking error signal to said first difference signal at times when the difference between said first and third output signals is less than zero, and to said second difference signal at times when the difference between said first and third output signals is greater than zero.

5. A tracking error signal generator comprising:

means for producing first, second, and third light fluxes aligned along a line having a predetermined angle with respect to a recording track on an information recording medium, said second light flux being positioned between said first and third light fluxes on said line;

first, second, and third light reception elements for receiving said first, second, and third fluxes, respectively, reflected from said information recording medium and for producing first, second, and third output signals, respectively, having values corresponding to the intensities of the reflected fluxes received by said light reception elements;

first difference means for producing a first difference signal corresponding to the difference between said first and second output signals;

second difference means for producing a second difference signal corresponding to the difference between said second and third output signals;

third difference means for producing a third difference signal corresponding to the difference between said first and third output signals; said third difference signal having a value relative to a pre-selected range of values varying from (1) a value less than a beginning value in said pre-selected range, (2) a value within said pre-selected range, to (3) a value greater than an ending value in said pre-selected range; and output means controlled by the value of said third difference signal for outputting a tracking error signal correspnding to (1) said third difference signal at times when said third difference signal is within said preselected range, (2) said first difference signal at times when said third difference signal is less than the beginning value in said preselected range, and (3) said second difference signal at times when said third difference signal is greater than the ending value in said preselected range.

6. A tracking error signal generator according to claim 5, wherein said first, second, and third difference means comprise first, second, and third differential amplifiers, respectively.

7. A tracking error signal generator according to claim 6, further including an amplifier for amplifying said second output signal and for supplying said amplified signal to each of said first and second differential amplifiers.

8. A tracking error signal generator according to claim 7, wherein said output means comprises:

a switch having a first input for receiving said first difference signal, a second input for receiving said second difference signal, a third input for receiving said third difference signal, a selection signal input for receiving a selection signal having a value corresponding to the value of said third difference signal, and an output for outputting said tracking error signal; and a comparator responsive to said third difference signal for generating said selection signal to cause said switch to set said tracking error signal selectively to said third difference signal, to said first difference signal, and to said second difference signal at times when the third difference signal has a value wherein the difference between said first and third output signals is within, below, or above said preselected range, respectively.

* * * * *